(12) United States Patent
Truong et al.

(10) Patent No.: US 8,966,313 B2
(45) Date of Patent: Feb. 24, 2015

(54) SYSTEMS AND METHODS FOR A SHARED DEBUG PIN

(75) Inventors: Huong M. Truong, Houston, TX (US);
Jason W. Whiteman, Tomball, TX (US);
Priti J. Patel, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 285 days.

(21) Appl. No.: 13/460,796

(22) Filed: Apr. 30, 2012

(65) Prior Publication Data

US 2013/0290785 A1 Oct. 31, 2013

(51) Int. Cl.
*G06F 11/00* (2006.01)

(52) U.S. Cl.
USPC .......................................................... 714/30

(58) Field of Classification Search
CPC .................... G06F 11/3656; G06F 11/2733
See application file for complete search history.

(56) References Cited

U.S. PATENT DOCUMENTS

| | | | | |
|---|---|---|---|---|
| 4,637,020 A * | 1/1987 | Schinabeck | | 714/736 |
| 7,007,184 B2 * | 2/2006 | Sabotta et al. | | 713/340 |
| 7,958,399 B2 | 6/2011 | Glotzbach et al. | | |
| 8,055,946 B2 | 11/2011 | Kang et al. | | |
| 8,601,315 B2 * | 12/2013 | Ehrlich et al. | | 714/14 |
| 2010/0299566 A1 * | 11/2010 | Han | | 714/726 |
| 2011/0041017 A1 | 2/2011 | Zhong et al. | | |
| 2011/0145909 A1 | 6/2011 | Rachakonda et al. | | |
| 2012/0274349 A1 * | 11/2012 | Hu et al. | | 324/763.01 |
| 2013/0031419 A1 * | 1/2013 | Haverkamp et al. | | 714/45 |

OTHER PUBLICATIONS

Bonnett et al., "Non-instrusive Board Test Strategies for the Intel Xeon Processor 5500 Series," Copyright 2009 ASSET InterTech, Inc., 19 p.

* cited by examiner

*Primary Examiner* — Christopher McCarthy
(74) *Attorney, Agent, or Firm* — Conley Rose, P.C.

(57) ABSTRACT

In some examples, a computer system includes a first component associated with a first power domain and a second component associated with a second power domain. The computer system also includes a debug port with a debug port pin shared by a debug operation pin of the first component and a corresponding debug operation pin of the second component. The computer system also includes a switch associated with the debug port pin to selectively isolate the debug operation pin of the first component from leakage current of the corresponding debug operation pin of the second component.

19 Claims, 5 Drawing Sheets

SYSTEMS AND METHODS FOR A SHARED DEBUG PIN

BACKGROUND

Many computer system platforms undergo a development phase and a production phase. For the development phase, a printed circuit board (PCB) may be populated with debug interfaces in order to resolve issues that arise with components such as the processor(s) and/or the input/output (I/O) controller hub chipset of a computer system platform. For the production phase, debug interfaces such as those for the processor and/or the I/O controller hub chipset may be depopulated from the PCB of a computer system platform to reduce production costs and to facilitate circuitry spacing. Sometimes component-specific issues arise or are discovered during the production phase. In such case, debugging the issues is more difficult if the debug interfaces available for the development phase have been removed for the production phase.

BRIEF DESCRIPTION OF THE DRAWINGS

For a detailed description of illustrative examples of the disclosure, reference will now be made to the accompanying drawings in which.

NOTATION AND NOMENCLATURE

Figure 1:
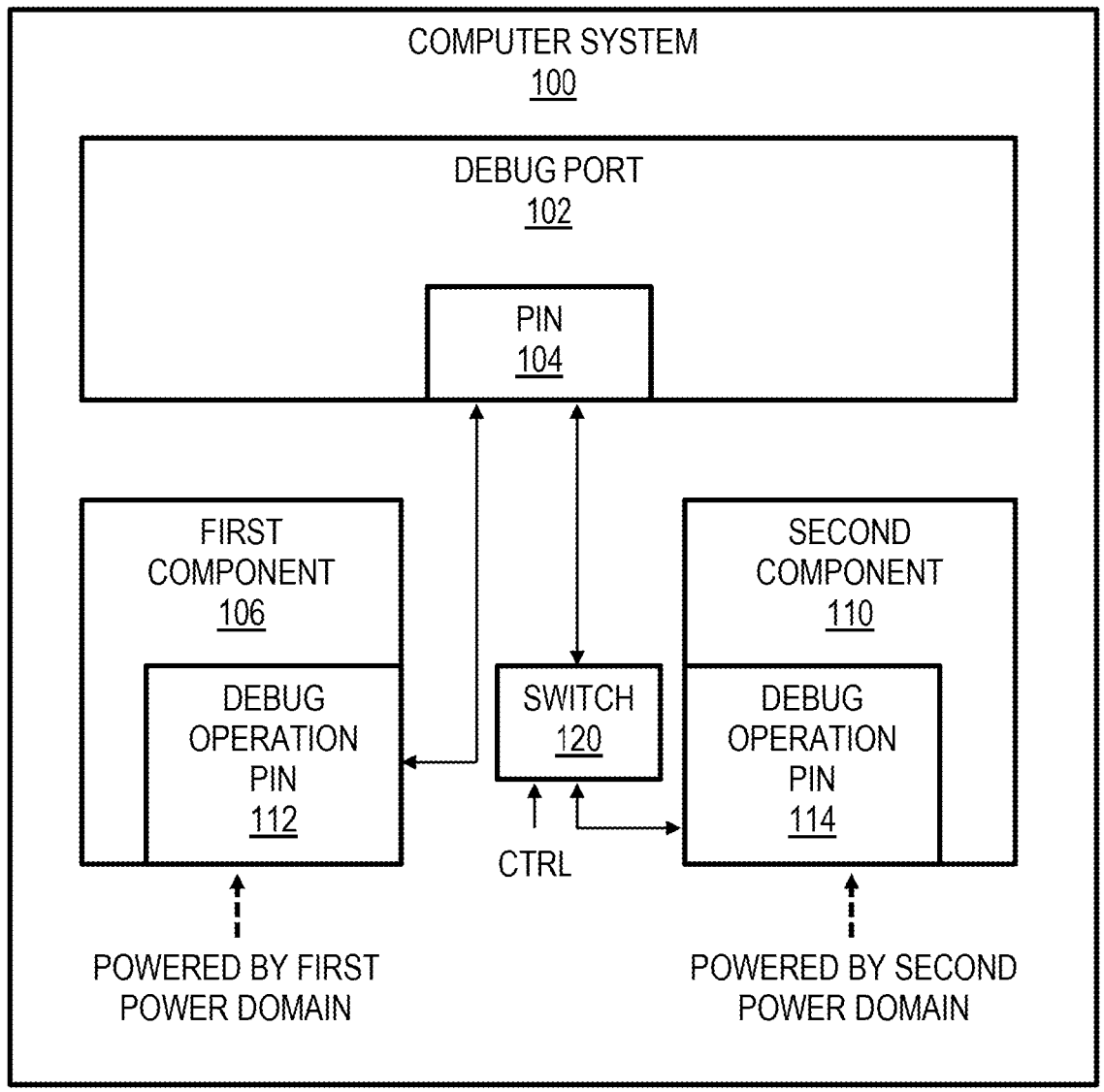
FIG. 1 shows a computer system in accordance with an example of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to systems and methods for sharing a debug interface (e.g., a debug port or connector) between a first component associated with a first power domain (e.g., a main power domain) and a second component associated with a second power domain (e.g., a standby power domain). To share the debug interface, a debug operation pin of the first component and a corresponding debug operation pin of the second component connect to the same debug interface pin. Also, a switch is provided between the debug operation pin of the first component and the corresponding debug operation pin of the second component to selectively isolate the debug operation pin of the first component from leakage current of the corresponding debug operation pin of the second component. In some examples, a plurality of debug operation pins of the first component are paired with corresponding debug operation pins of the second component, where each pair shares a respective debug interface pin. In such case, a switch is provided between each paired debug operation pin of the first component and corresponding debug operation pin of the second component to selectively isolate the debug operation pin of the first component from leakage current of the corresponding debug operation pin of the second component.

Without limitation to other examples, the systems and methods disclosed herein were developed for sharing an extended debug port (XDP) between at least one processor and an I/O controller hub chipset. In one XDP example, the test data in (TDI) pin of a Sandy Bridge architecture processor and the TDI pin of a Patsburg chipset are connected to a single TDI pin of the XDP connector. Similarly, the test mode select (TMS) pin of a Sandy Bridge architecture processor and the TMS pin of a Patsburg chipset are connected to a single TMS pin of the XDP connector. Further, the test data out (TDO) pin of the Sandy Bridge architecture processor and the TDO pin of the Patsburg chipset connected to a single TDO pin of the XDP connector. For the clock signals, a first XDP test clock (TCK0) clocks the test clock (TCK) pin of the Sandy Bridge architecture processor and a second XDP test clock (TCK1) clocks the TCK pin of the Patsburg chipset. In this scheme, one single XDP script can be used for both the Sandy Bridge architecture processor and the Patsburg chipset. Further, isolation circuitry is added to prevent leakage current between the TDI pin of the Sandy Bridge architecture processor and the corresponding TDI pin of the Patsburg chipset as the TDI signal is on a main rail power domain for the processor and is on a standby rail power domain for the Patsburg chipset. Similarly, isolation circuitry may be added to prevent leakage current between the TMS pin of a Sandy Bridge architecture processor and the corresponding TMS pin of a Patsburg chipset as the TMS signal is on a main rail power domain for the Sandy Bridge architecture processor and is on a standby rail power domain for the Patsburg chipset.

The disclosed systems and methods facilitate debugging of computer systems after they are in production in a manner that is less expensive and consumes less space than providing separate debug interfaces for the processor(s) and the I/O controller hub chipset (i.e., one debug interface port or connector is used instead of two or more). Also, the number of debug scripts can be reduced from two or more down to one debug script.

FIG. 1 shows a computer system 100 in accordance with an example of the disclosure. Without limitation to other examples, the computer system 100 may correspond to a blade server or other headless computer. As shown, the computer system 100 comprises a debug port 102 with a pin 104 shared by a first component 106 and a second component 110. More specifically, the pin 104 connects to a debug operation pin 112 of the first component 106 and a corresponding debug operation pin 114 of the second component 110. Further, in FIG. 1, the first component 106 is powered by a first power domain (e.g., a main rail power domain) and the second component 110 is powered by a second power domain (e.g., a standby rail power domain). In FIG. 1, the debug port 104 may comprise, for example, an extended debug port (XDP) connector and the first component 106 may combine processor and North Bridge functionality for the computer system 100 such as is done for the Sandy Bridge architecture processor. Meanwhile, the second component 110 may provide South Bridge functionality for the computer system 100 such as is done for the Patsburg chipset.

In some example, the pin 104 shared by the debug operation pin 112 of the first component 106 and the corresponding debug operation pin 114 of the second component 110 corresponds to a test data in (TDI) signal pin. Alternatively, the pin 104 shared by the debug operation pin 112 of the first component 106 and the corresponding debug operation pin 114 of the second component 110 corresponds to a test mode select (TMS) signal pin.

As shown in FIG. 1, a switch 120 is placed between the debug operation pin of the first component 106 and the corresponding debug operation pin 114 of the second component 110 to selectively isolate the debug operation pin 112 of the first component 106 from leakage current of the corresponding debug operation pin 114 of the second component 110. The switch 120 is controlled by a control signal (CTRL). Without limitation to other examples, the switch 120 may correspond to a transistor placed close to a termination resistor (e.g., a pull-up resistor) for the debug operation pin 114 so as to minimize the amount of circuitry used to isolate the debug operation pin 112 from leakage current output from the debug operation pin 114 (i.e., existing circuitry may be used to integrate the switch 120). The leakage current may exist, for example, due to the second component 110 being powered when the first component 106 is not powered. In such case, CTRL opens the switch 120 when the computer system 100 is off and closes the switch 120 when the computer system 100 is on.

In some examples, the switch 120 selectively disconnects a TMS pin of the second component 110 from a TMS pin of the first component 106 based on a main power domain state of the computer system 100 (i.e., CTRL tracks the main rail power domain state). In other examples, the switch 120 selectively disconnects a TDI pin of the second component 110 from a TDI pin of the first component 106 based on a main power domain state of the computer system 110. When the main power domain state is on, the first component 106 receives power and is in an operative state. When the main power domain state is off, the first component 106 does not receive power and is in an inoperative state. In contrast, the second component 110 receives power from a standby power domain. The standby power domain provides power to some components of the computer system 100, including the second component 110, even when the computer system 100 is turned off (i.e., when the main rail power domain state is off). Accordingly, in response to the computer system 100 being turned off, the switch 120 disconnects the debug operation pin 112 of the first component 106 from the corresponding debug operation pin 114 of the second component 110. Further, in response to the computer system 100 being turned on, the switch 120 connects the debug operation pin 112 of the first component 106 to the corresponding debug operation pin 114 of the second component 110 (i.e., leakage current from the second component 110 to the first component 106 is no longer a concern once the first component 106 receives power from the main power domain). For some examples, the switch 120 comprises a transistor positioned between a pull-up termination resistor or pull-down termination resistor and a respective TDI pin or TMS pin of the second component 110.

Figure 2:
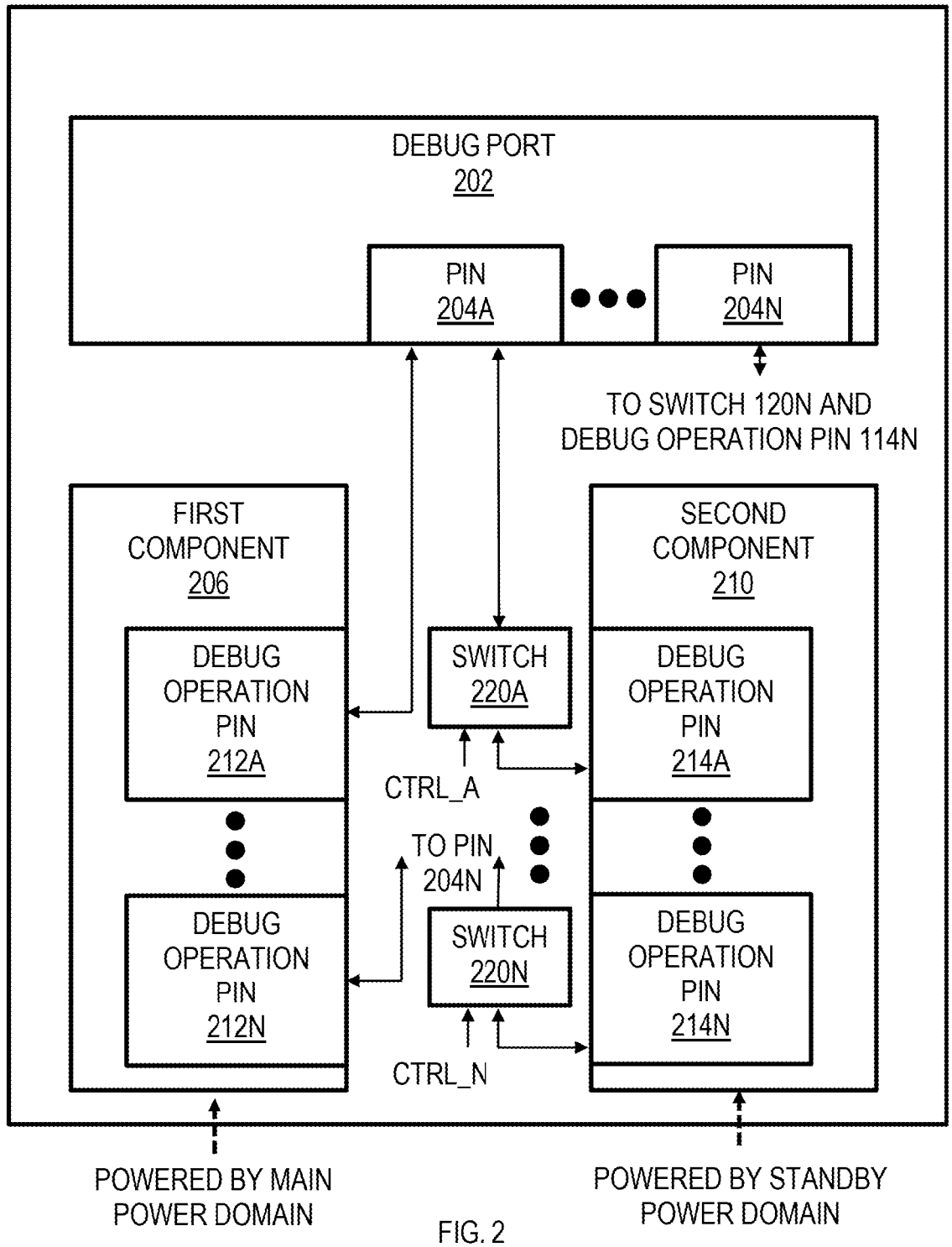
FIG. 2 shows another computer system in accordance with an example of the disclosure.

FIG. 2 shows another computer system 200 in accordance with the disclosure. In the computer system 200, the debug port 202 comprises multiple pins 204A-204N, where each of the pins 204A-204N is shared by respective debug operation pins 212A-212N of the a first component 206 and debug operation pins 214A-214N of the I/O controller hub chipset 210. In other words, the pin 204A is shared by the debug operation pin 212A of the processor 206 and the debug operation pin 214A of a second component 210, the pin 204B is shared by the debug operation pin 212B of the first component 206 and the debug operation pin 214B of the second component 210, and so on.

In FIG. 2, the debug port 104 may comprise, for example, an extended debug port (XDP) connector and the first component 206 may combine processor and North Bridge functionality for the computer system 200 such as is done for the Sandy Bridge architecture processor. Meanwhile, the second component 210 may provide South Bridge functionality for the computer system 100 such as is done for the Patsburg chipset.

As shown, the computer system 200 also comprises a plurality of switches 220A-220N to electrically isolate the first component 206 from leakage current output by the second component 210. More specifically, the switches 220A-220N are placed between each debug operation pin 212A-212N of the first component 206 and the respective corresponding debug operation pin 214A-214N of the second component 210 to selectively isolate the debug operation pins 212A-212N of the first component 206 from leakage current of the corresponding debug operation pins 214A-214N of the second component 210. The switches 220A-220N are controlled by respective control signals (CTRL_A to CTRL_N). Without limitation to other examples, the switches 220A-220N may correspond to transistors placed close to a termination resistor (e.g., a pull-up resistor) for the debug operation pins 214A-214N so as to minimize the amount of circuitry used to isolate the debug operation pin 212A-212N from leakage current output from the debug operation pins 214A-214N. As previously mentioned, the leakage current may exist, for example, due to the second component 210 being powered when the first component 206 is not powered. In such case, CTRL_A to CTRL_N open the switches 220A-220N when the computer system 200 is off and close the switches 220A-220N when the computer system 200 is on.

In some examples, the switches 220A-220N selectively disconnect both of a TMS pin and a TDI pin of the second component 210 from a respective TMS pin and TDI pin of the first component 206 based on a main power domain state of the computer system 200 (i.e., CTRL_A to CTRL_N track the main rail power domain state). In some examples, the switches 220A-220N comprise a plurality of transistors, where each transistor is positioned between a pull-up termination resistor or pull-down termination resistor and a respective TDI pin or TMS pin of the second component 210.

Figure 3:
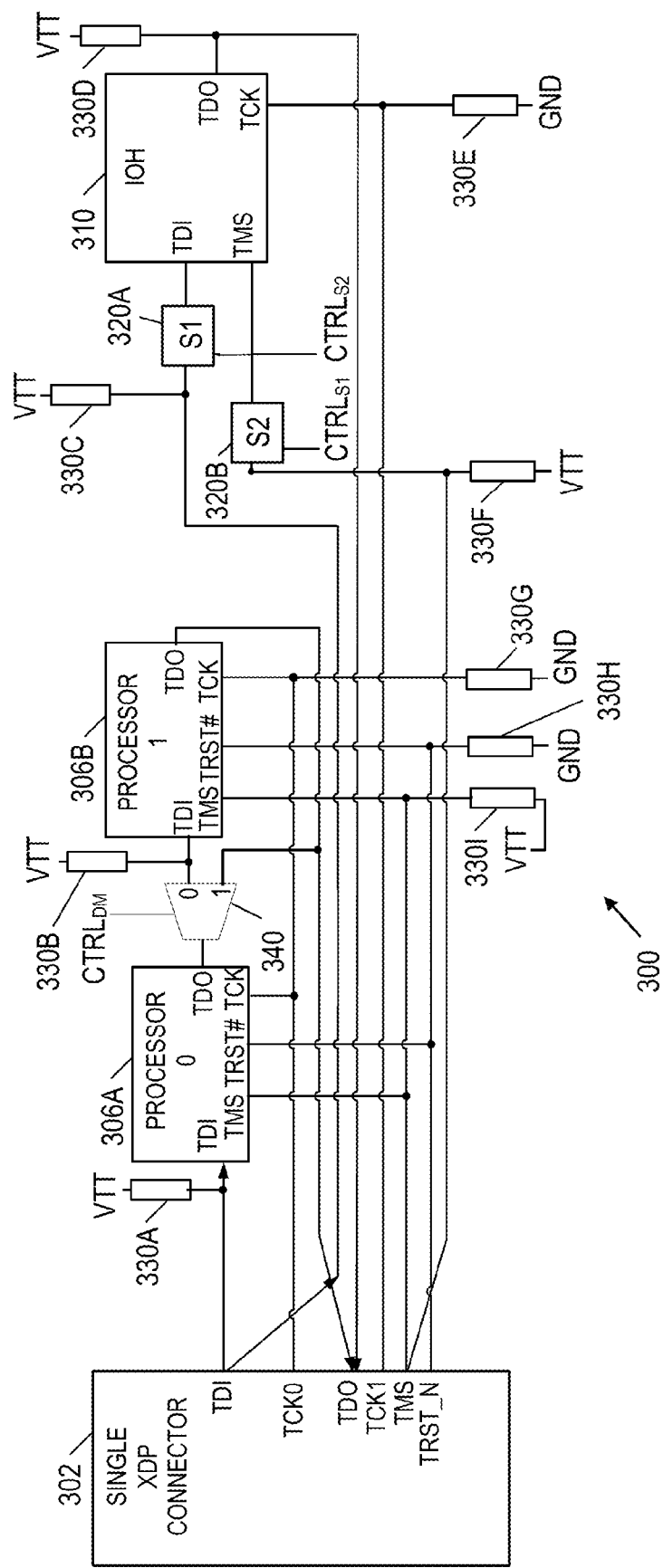
FIG. 3 shows a debug interface schematic diagram for a computer system in accordance with an example of the disclosure.

FIG. 3 shows a debug interface schematic diagram 300 for a computer system (e.g., computer systems 100 or 200) in accordance with an example of the disclosure. In the debug interface schematic diagram 300, a single XDP connector 302 with a test data in (TDI) pin, a test clock 0 (TCL0) pin, a test data out (TDO) pin, a test clock 1 (TCK1) pin, a test mode select (TMS) pin, and a test reset (TRST_N) pin is provided.

Without limitation to other examples, in the debug interface schematic diagram 300 of FIG. 3, the TDI pin of the XDP connector 302 is shared by a TDI pin of a processor 306A and a TDI pin of a I/O controller hub chipset (e.g., labeled "IOH") 310. Further, the TDO pin of the XDP connector 302 is shared by a TDO pin of a processor 306B and a TDO pin of the I/O controller hub chipset 310. Further, the TMS pin of the XDP connector 302 is shared by a TMS pin of the processor 306A, the TMS pin of the processor 306B, and the TMS pin of the I/O controller hub chipset 310. As shown, the TDO pin of the processor 306A connects to a demultiplexer 340 that forwards the TDO pin output to a TDI pin of the processor 306B or to the TDO pin of the XDP connector 302 based on a control signal. In some examples, the control signal (CTRL$_{DM}$) for the demultiplexer 340 may forward the TDO pin output of the processor 306A to the TDI pin of the processor 306B based on whether the processor 306B is installed. In such case, the processors 306A and 306B may be tested together by a single debug script.

In the debug interface schematic diagram 300, a switch (S1) 320A is positioned between a termination resistor 330C and the TDI pin of the I/O controller hub chipset 310. The switch 320A provides selective electrical isolation between the TDI pin of the processor 306A and the TDI pin of the I/O controller hub chipset 310. Meanwhile, switch (S2) 320B is positioned between termination resistor 330F and the TMS pin of the I/O controller hub chipset 310. The switch 320B provides selective electrical isolation between the TMS pins of the processors 306A and 306B, and the TMS pin of the I/O controller hub chipset 310. In the example of FIG. 3, the switches 320A and 320B control the flow of current based on control signals CTRL$_{S1}$ and CTRL$_{S2}$ that indicate when a main power domain state is on or off. The switches 320A and 320B may correspond to transistors, for example. If the main power domain state is on (i.e., a related computer system is on), the switches 320A and 320B allow current flow. If the main power domain state is off (i.e., a related computer system in off), the switches 320A and 320B do not allow current flow to prevent current from being leaked from the TDI and TMS pins of the I/O controller hub chipset 310 to the TDI and TMS pins of the processor 306A and/or the processor 306B.

The debug interface schematic diagram 300 also shows that the TCK0 pin of the XDP connector 302 connects to the TCK pins of the processors 306A and 306B. Meanwhile, the TCK1 pin of the XDP connector 302 connects to the TCK pin of the I/O controller hub chipset 310. In this manner, the debug clock for the processors 306A and 306B may be a different rate than the debug clock for the I/O controller hub chipset 310. The TRST_N pin of the XDP connector 302 connects to the TRST# pins of the processors 306A and 306B.

Also shown in debug interface schematic diagram 300 are various termination resistors 330A-330I. More specifically, the termination resistor 330A may is a 51 ohm pull-up resistor for the TDI pin of the processor 306A, the termination resistor 330B is a 75 ohm pull-up resistor for the TDI pin of the processor 306B, the termination resistor 330C is a 51 ohm pull-up resistor for the TDI pin of the I/O controller hub chipset 310, the termination resistor 330D is a 51 ohm pull-up resistor for the TDO pin of the I/O controller hub chipset 310, the termination resistor 330E is a 51 ohm pull-down resistor for the TCK pin of the I/O controller hub chipset 310, the termination resistor 330F is a 51 ohm pull-up resistor for the TMS pin of the I/O controller hub chipset 310, the termination resistor 330G is a 51 ohm pull-down resistor for the TCK pins of the processors 306A and 306B, the termination resistor 330H is a 51 ohm pull-down resistor for the TRST# pins of the processors 306A and 306B, and the termination resistor 330I is a 51 ohm pull-up resistor for the TMS pin of the processor 306A. The resistance values for the resistors 330A-330I are based, for example, on compatibility recommendations or testing for particular processors 306A and 306B (e.g., Sandy Bridge architecture processors), and for the I/O controller up chipset 310. Such termination resistance values may vary for different processors and chipsets.

Figure 4:
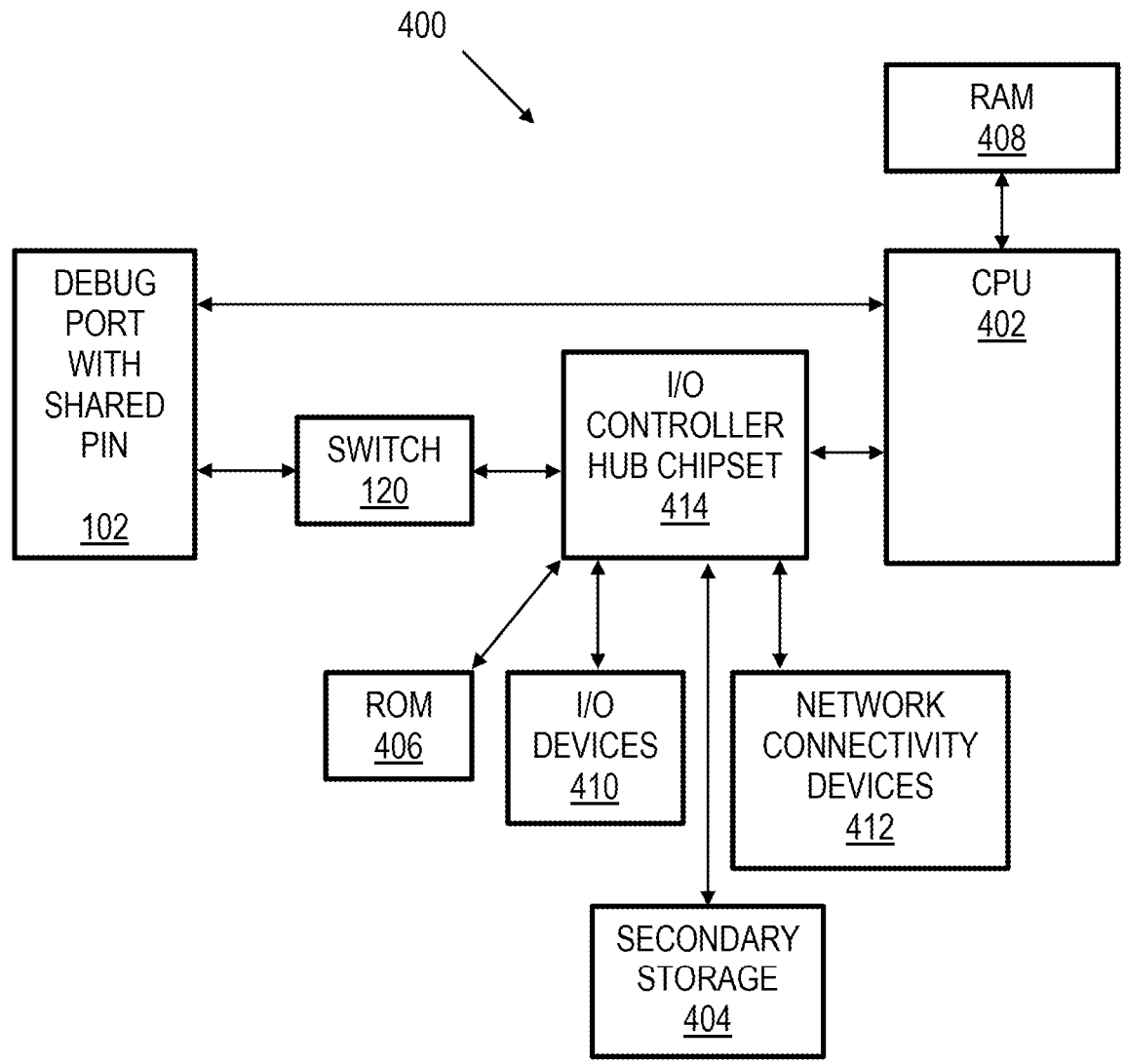
FIG. 4 shows various components of a computer system in accordance with an example of the disclosure.

FIG. 4 shows various components of a computer system 400 in accordance with an example of the disclosure. The computer system 400 may correspond to and may additionally comprise the components of the computer systems 100 and 200 described for FIGS. 1 and 2. In some examples, the computer system 400 may be a blade server with a single debug interface for its processor(s) and I/O controller hub chipset as described herein. Alternatively, the computer system 400 may be another desktop or portable computer with a single debug interface for its processor(s) and I/O controller hub chipset.

As shown, the computer system 400 includes a processor 402 (which may be referred to as a central processor unit or CPU) that is in communication with an I/O controller hub chipset 414 and random access memory (RAM) 408. The I/O controller hub chipset 414 may correspond to the second component 110 of FIG. 1, the second component 210 of FIG. 2, and/or the I/O controller hub chipset 310 of FIG. 3. The processor 402 is also in communication with secondary storage 404, read only memory (ROM) 406, input/output (I/O) devices 410, and network connectivity devices 412 via the I/O controller hub chipset 410. The processor 402 may be implemented as one or more CPU chips. As shown, the processor 402 and the I/O controller hub chipset 410 couple to the debug port 102 (by sharing a debug port pin), and a switch 120 is used to prevent leakage current from the I/O controller hub chipset 410 from reaching the processor 402 as described herein. In some examples, the switch 120 may correspond to multiple switches.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. In the electrical engineering and software engineering arts it is known that functionality can be implemented by loading executable software into a computer or can be implemented as a hardware implementation by well known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Thus, a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 384. The secondary storage 404, the RAM 408, and/or the ROM 406 may be referred to in some contexts as computer readable storage media and/or non-transitory computer readable media. In the examples provided herein, a debug script stored by the secondary storage 404, the RAM 408, and/or the ROM 406 may be executed by the processor 402 to test functionality of processors and/or an I/O controller hub chipset via a single debug interface as described herein.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk based systems may all be considered secondary storage 404), ROM 406, RAM 408, or the network connectivity devices 412. For example, a debug script may be executed by the processor 402 to perform debug operations for the processor 402 and/or the I/O controller hub chipset 410 via the debug port as described herein. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly bound to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider. In light of the variations for the computer system 400, the architecture for sharing a debug connector/port pin by multiple computer system components as described herein may likewise vary and should not limited to a particular example.

Figure 5:
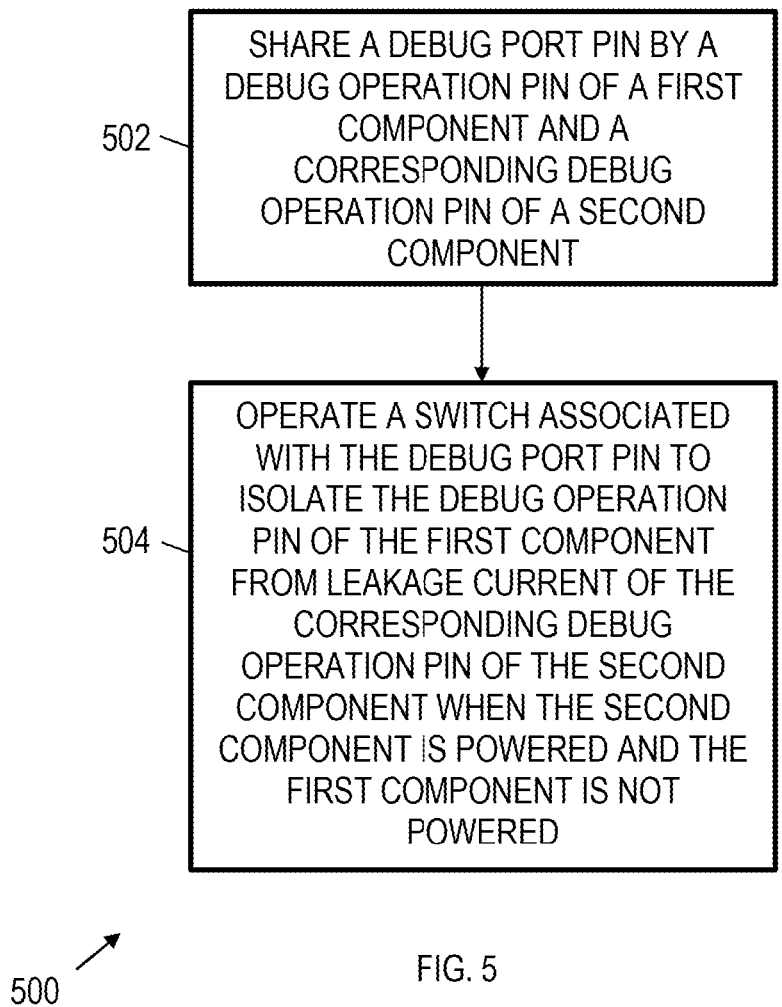
FIG. 5 shows a method in accordance with an example of the disclosure.

FIG. 5 shows a method 500 in accordance with an example of the disclosure. As shown, the method 500 comprises sharing a debug port pin by a debug operation pin of a processor and a corresponding debug operation pin of an I/O controller hub chipset (block 502). At block 504, a switch associated with the debug port pin is selectively operated to isolate the debug operation pin of the processor from leakage current of the corresponding debug operation pin of the I/O controller hub chipset. For example, the switch may be operated based on a main power domain state of the computer system. When operated, the switch selectively disconnects the debug operation pin of the processor from the corresponding debug operation pin of the I/O controller hub chipset. In some examples, the switch operates to selectively disconnect a TDI signal pin of the processor from a corresponding TDI signal pin of the I/O controller hub chipset. Additionally or alternatively, the switch operates to selectively disconnect a TMS signal pin of the processor from a corresponding TMS signal pin of the I/O controller hub chipset.

In some examples, the method 500 may comprise additional steps. For example, the method 500 may additionally comprise supplying power to the I/O controller hub chipset even when the computer system is off and disconnecting the debug operation pin of the processor from the corresponding debug operation pin of the I/O controller hub chipset while the computer system is turned off. The method 500 may additionally comprise supplying power to the I/O controller hub chipset even when the computer system is off and connecting the debug operation pin of the processor to the corresponding debug operation pin of the I/O controller hub chipset while the computer system is turned on. The method 500 may additionally comprise other operations related to sharing a debug connector/port pin by multiple computer system components as described herein.

While several examples have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein. For examples, the disclosed technique could be implemented for any debug interface scenario, where a debug port pin is shared by components associated with different power domains. Such debug interface scenarios may arise for an in-circuit emulator (ICE) debug interface, a complex programmable logic device (CPLD) debug interface, an Advanced Micro Devices (AMD) debug interface, other debug interfaces. It is intended that the following claims be interpreted to embrace all such variations and modifications.

What is claimed is:

1. A computer system, comprising:
    a first component associated with a first power domain of the computer system;
    a second component associated with a second power domain of the computer system that is different than the first power domain;
    a debug port with a debug port pin shared by a debug operation pin of the first component and a corresponding debug operation pin of the second component; and
    a switch coupled to the debug port pin to isolate the debug operation pin of the first component from leakage current of the corresponding debug operation pin of the second component,
    wherein the switch comprises a transistor positioned between a pull-up resistor or pull-down resistor and the debug operation pin of the second component.

2. The computer system of claim 1, wherein the first component is a processor and the second component is an input/output (I/O) controller hub chipset.

3. The computer system of claim 1, wherein the debug port pin shared by the debug operation pin of the first component and the corresponding debug operation pin of the second component corresponds to a test data in (TDI) signal pin.

4. The computer system of claim 1, wherein the debug port pin shared by the debug operation pin of the first component and the corresponding debug operation pin of the second component corresponds to a test mode select (TMS) signal pin.

5. The computer system of claim 1, wherein the debug port comprises an extended debug port (XDP) connector.

6. The computer system of claim 1, wherein the switch selectively disconnects a test mode select (TMS) pin of the second component from a TMS pin of the first component based on a main power domain state of the computer system corresponding to the first power domain.

7. The computer system of claim 1, wherein the switch selectively disconnects a test data in (TDI) pin of the second component from a TDI pin of the first component based on a main power domain state of the computer system.

8. The computer system of claim 1, wherein the second component receives power from a standby power domain corresponding to the second power domain even when the computer system is turned off, and wherein the switch disconnects the debug operation pin of the first component from the corresponding debug operation pin of the second component in response to the computer system being turned off.

9. The computer system of claim 1, wherein the second component receives power from a standby power domain corresponding to the second power domain even when the computer system is turned off, and wherein the switch connects the debug operation pin of the first component to the corresponding debug operation pin of the second component in response to the computer system being turned on.

10. The computer system of claim 1, further comprising at least one additional switch, wherein each of the at least one additional switch selectively disconnects a different debug operation pin of the first component from a corresponding debug operation pin of the second component.

11. A method for a computer system, comprising:
    sharing a debug port pin of a debug port by a debug operation pin of a first component and a corresponding debug operation pin of a second component, wherein the first component is associated with a first power domain of the computer system and the second component is associated with a second power domain of the computer system that is different than the first power domain; and
    operating a switch coupled to the debug port pin to isolate the debug operation pin of the first component from leakage current of the corresponding debug operation pin of the second component when the second component is powered and the first component is not powered, the switch comprising a transistor positioned between a pull-up resistor or pull-down resistor and the debug operation pin of the second component.

12. The method of claim 11, wherein operating the switch comprises operating the switch based on a main power domain state of the computer system.

13. The method of claim 11, wherein operating the switch comprises disconnecting a test data in (TDI) signal pin of the first component from a corresponding TDI signal pin of the second component, or disconnecting a test model select (TMS) signal pin of the first component from a corresponding TMS signal pin of the second component.

14. The method of claim 11, further comprising supplying power to an I/O controller hub chipset corresponding to the second component even when the computer system is off and operating the switch to disconnect the debug operation pin of a processor corresponding to the first component from the corresponding debug operation pin of the I/O controller hub chipset in response to the computer system being turned off.

15. The method of claim 12, further comprising supplying power to an I/O controller hub chipset corresponding to the second component even when the computer system is off and operating the switch to connect the debug operation pin of a processor corresponding to the first component to the corresponding debug operation pin of the I/O controller hub chipset in response to the computer system being turned on.

16. A debug interface for a computer system, comprising:
    a connector having a debug interface pin shared by a debug operation pin of a first component and a corresponding debug operation pin of a second component wherein the first component is associated with a first power domain of the computer system and the second component is associated with a second power domain of the computer system that is different than the first power domain; and
    a switch coupled to the debug interface pin to isolate the debug operation in of the first component from leakage current of the corresponding debug operation pin of the second component when the second component is powered and the first component is not powered,
wherein the switch comprises a transistor positioned between a pull-up resistor or pull-down resistor and a debug operation pin of the second component.

17. The debug interface of claim 16, wherein the switch is one of a plurality of switches associated with different debug interface pins of the connector shared by the first component and the second component, and wherein each of the plurality of switches operates to isolate the first component from leakage current of the second component when the second component is on and the first component is off.

18. The debug interface of claim 16, wherein the debug interface pin corresponds to a test data in (TDI) pin and wherein the switch is placed between the TDI pin and the second component and is controlled by a main power domain status signal of the computer system.

19. The debug interface of claim 16, wherein the debug interface pin corresponds to a test mode select (TMS) pin and wherein the switch is placed between the TMS pin and the second component and is controlled by a main power domain status signal of the computer system.

\* \* \* \* \*